US012563040B2

(12) United States Patent (10) Patent No.: US 12,563,040 B2
Kaji et al. (45) Date of Patent: Feb. 24, 2026

(54) DATA CIRCULATION CONTROL METHOD, DATA CIRCULATION CONTROL SYSTEM, AND APPROVAL SERVER

(71) Applicant: Hitachi, Ltd., Tokyo (JP)

(72) Inventors: Tadashi Kaji, Tokyo (JP); Hiromitsu Kato, Tokyo (JP); Masayuki Yoshino, Tokyo (JP); Hiroki Uchiyama, Tokyo (JP); Tomohiro Shigemoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 367 days.

(21) Appl. No.: 18/031,973

(22) PCT Filed: Jan. 27, 2022

(86) PCT No.: PCT/JP2022/003015
§ 371 (c)(1),
(2) Date: Apr. 14, 2023

(87) PCT Pub. No.: WO2022/163741
PCT Pub. Date: Aug. 4, 2022

(65) Prior Publication Data
US 2023/0388306 A1 Nov. 30, 2023

(30) Foreign Application Priority Data
Jan. 28, 2021 (JP) ................................. 2021-012363

(51) Int. Cl.
*H04L 9/40* (2022.01)
(52) U.S. Cl.
CPC .............. *H04L 63/10* (2013.01); *H04L 63/20* (2013.01)
(58) Field of Classification Search
CPC ....... H04L 63/10; H04L 63/20; H04L 63/105; H04L 63/1433; G06F 2221/2113; G06F 21/6218; G06F 21/604
(Continued)

(56) References Cited

U.S. PATENT DOCUMENTS

| | | | | |
|---|---|---|---|---|
| 7,549,162 B2 * | 6/2009 | Aaron | .............. | G08B 13/19656 |
| | | | | 726/23 |
| 7,890,530 B2 | 2/2011 | Bilger et al. | | |
| 8,661,062 B1 * | 2/2014 | Jamail | ................... | G06F 21/554 |
| | | | | 713/182 |
| 8,838,981 B2 * | 9/2014 | Ureche | ................. | H04L 9/3247 |
| | | | | 713/176 |

(Continued)

FOREIGN PATENT DOCUMENTS

| | | |
|---|---|---|
| JP | 2014-229039 A | 12/2014 |
| JP | 2018-142284 A | 9/2018 |

OTHER PUBLICATIONS

Extended European Search Report issued on Oct. 31, 2024 for European Patent Application No. 22745960.9.

*Primary Examiner* — Lizbeth Torres-Diaz
(74) *Attorney, Agent, or Firm* — Volpe Koenig

(57) ABSTRACT

In a data circulation control method, an approval server including a processor and a memory controls access to data between a provision party computer providing the data and a use party computer using data. The method includes: a purpose accomplishment status notifying step in which the use party computer notifies the approval server of a use status of the previously approved data; a use application step in which the use party computer makes application to the approval server for a use policy including protection level information related to a security measure when the data is used and a use purpose of the data; and an access control step in which the approval server controls access of the use party computer to the data of the provision party computer based on the use status of the data, the protection level information, and the use purpose of the data.

11 Claims, 14 Drawing Sheets

(58) Field of Classification Search
USPC ............................ 726/3, 26, 12, 23; 713/182
See application file for complete search history.

(56) References Cited

U.S. PATENT DOCUMENTS

| | | | | |
|---|---|---|---|---|
| 10,122,757 | B1 | 11/2018 | Kruse et al. | |
| 10,154,007 | B1 * | 12/2018 | Viswanathan | H04L 63/20 |
| 11,449,623 | B2 * | 9/2022 | Little | G06N 20/00 |
| 2006/0184524 | A1 * | 8/2006 | Pollanz | G16H 10/60 |
| 2014/0189098 | A1 * | 7/2014 | MaGill | H04L 63/104 |
| | | | | 709/224 |
| 2014/0351946 | A1 | 11/2014 | Oikawa et al. | |
| 2015/0046972 | A1 * | 2/2015 | Zurko | G06F 21/6218 |
| | | | | 726/1 |
| 2018/0069866 | A1 * | 3/2018 | Chalmers | H04L 63/20 |
| 2019/0089729 | A1 * | 3/2019 | Nishi | H04L 63/10 |
| 2021/0075794 | A1 * | 3/2021 | Gazit | H04L 63/1408 |

* cited by examiner

[FIG. 1]
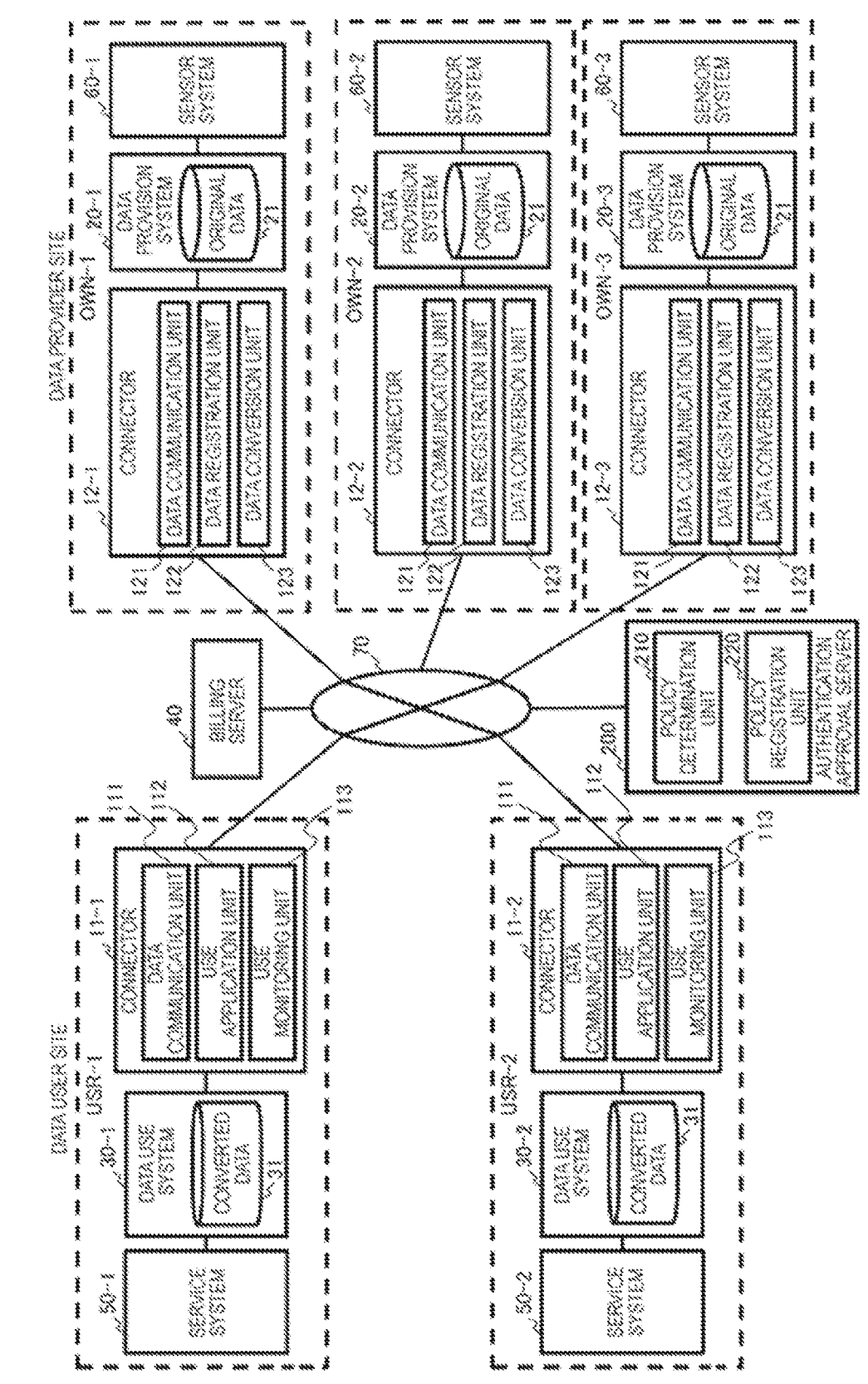

[FIG. 2]
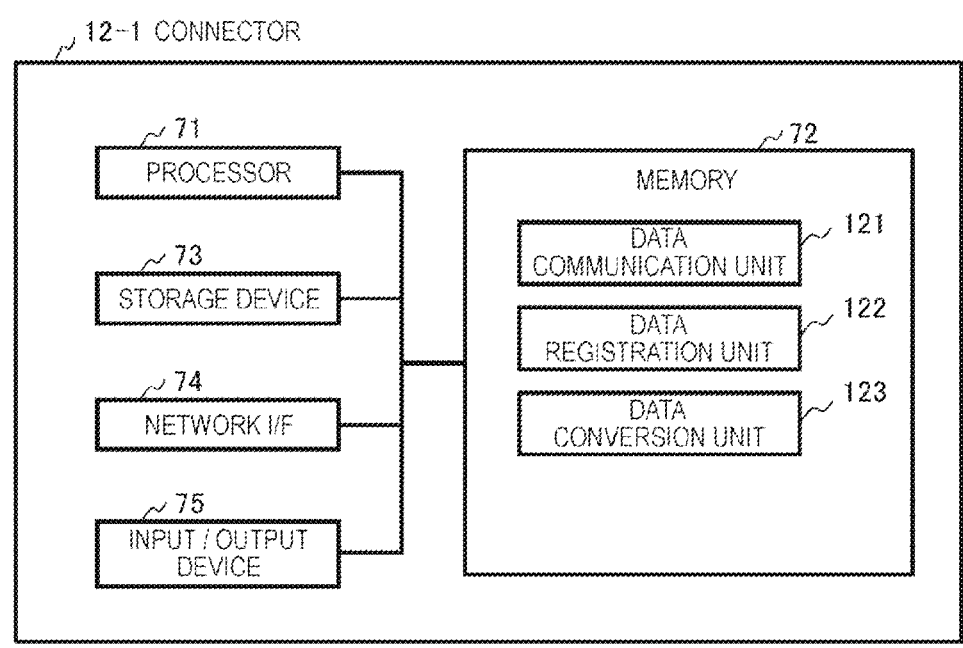
[FIG. 3]
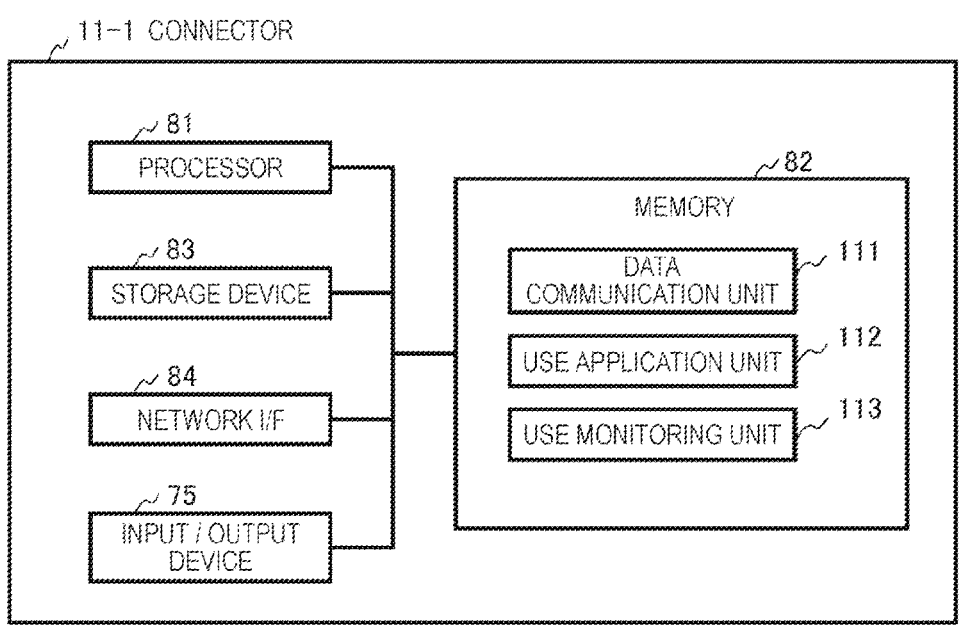

[FIG. 4]
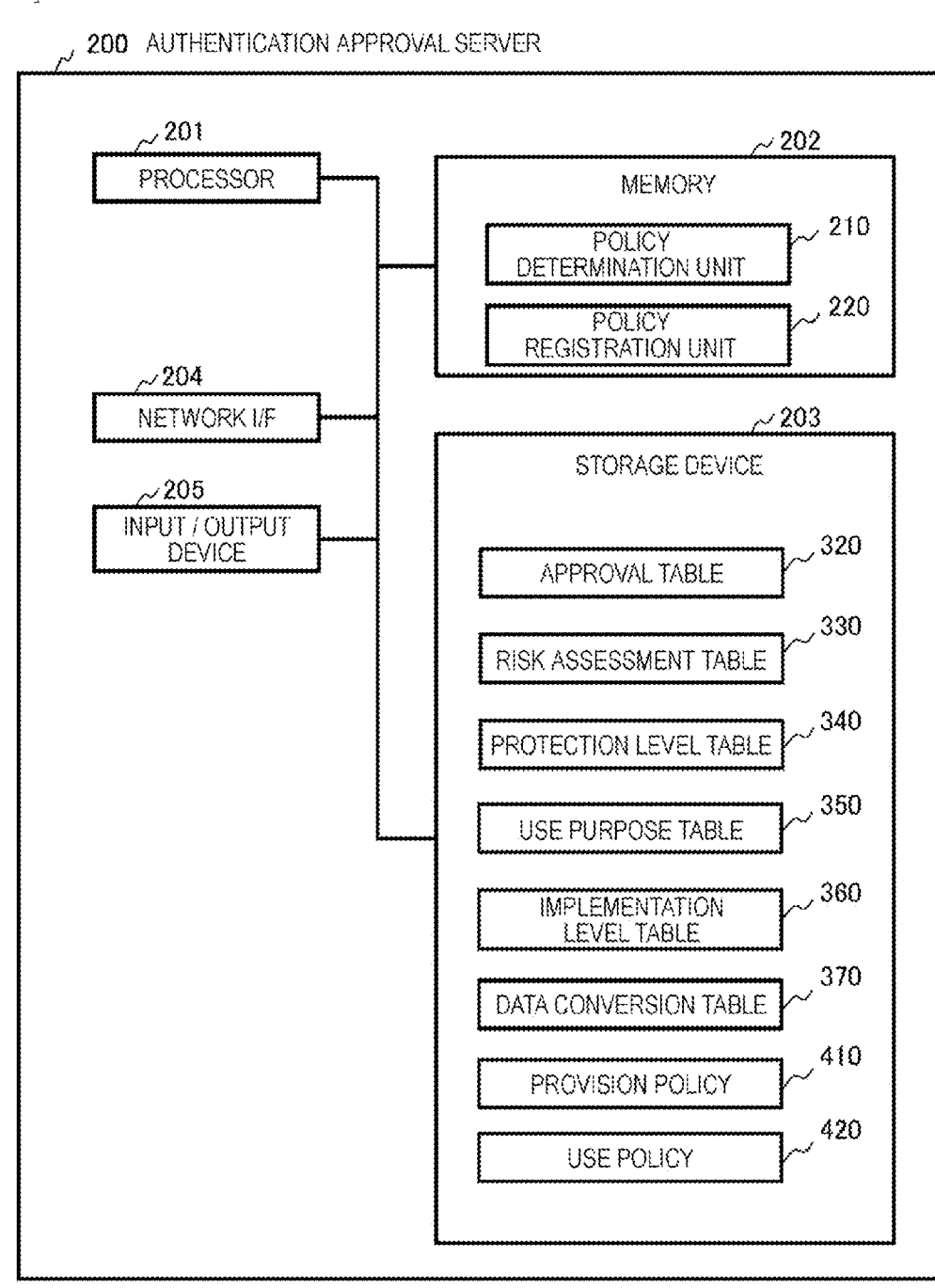

[FIG. 5]
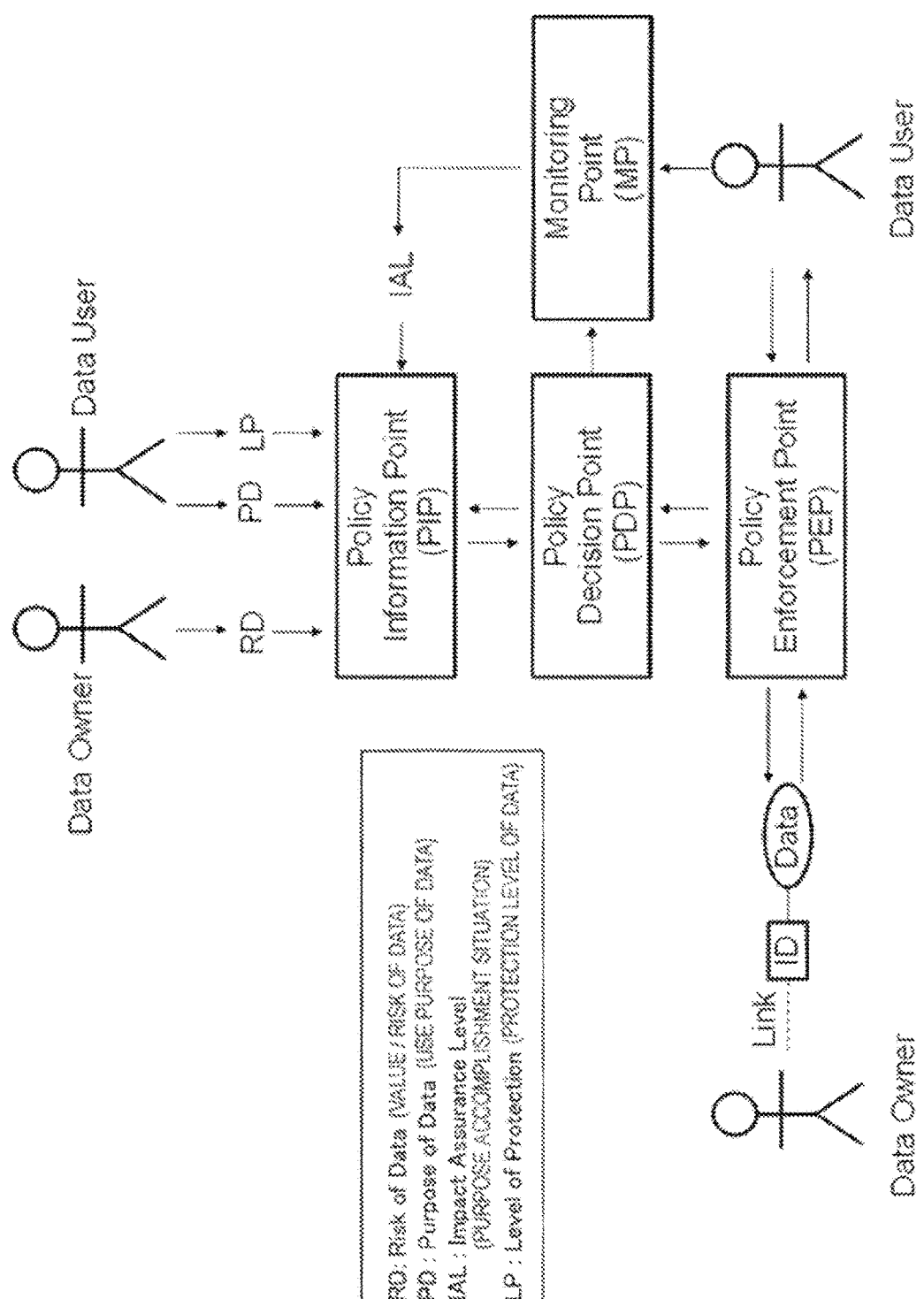

[FIG. 6]
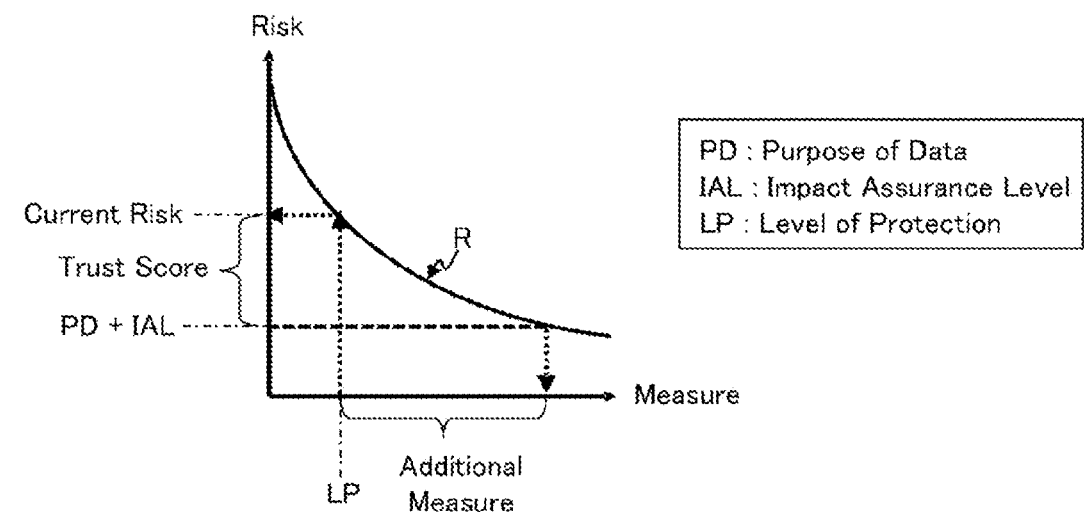

[FIG. 7]
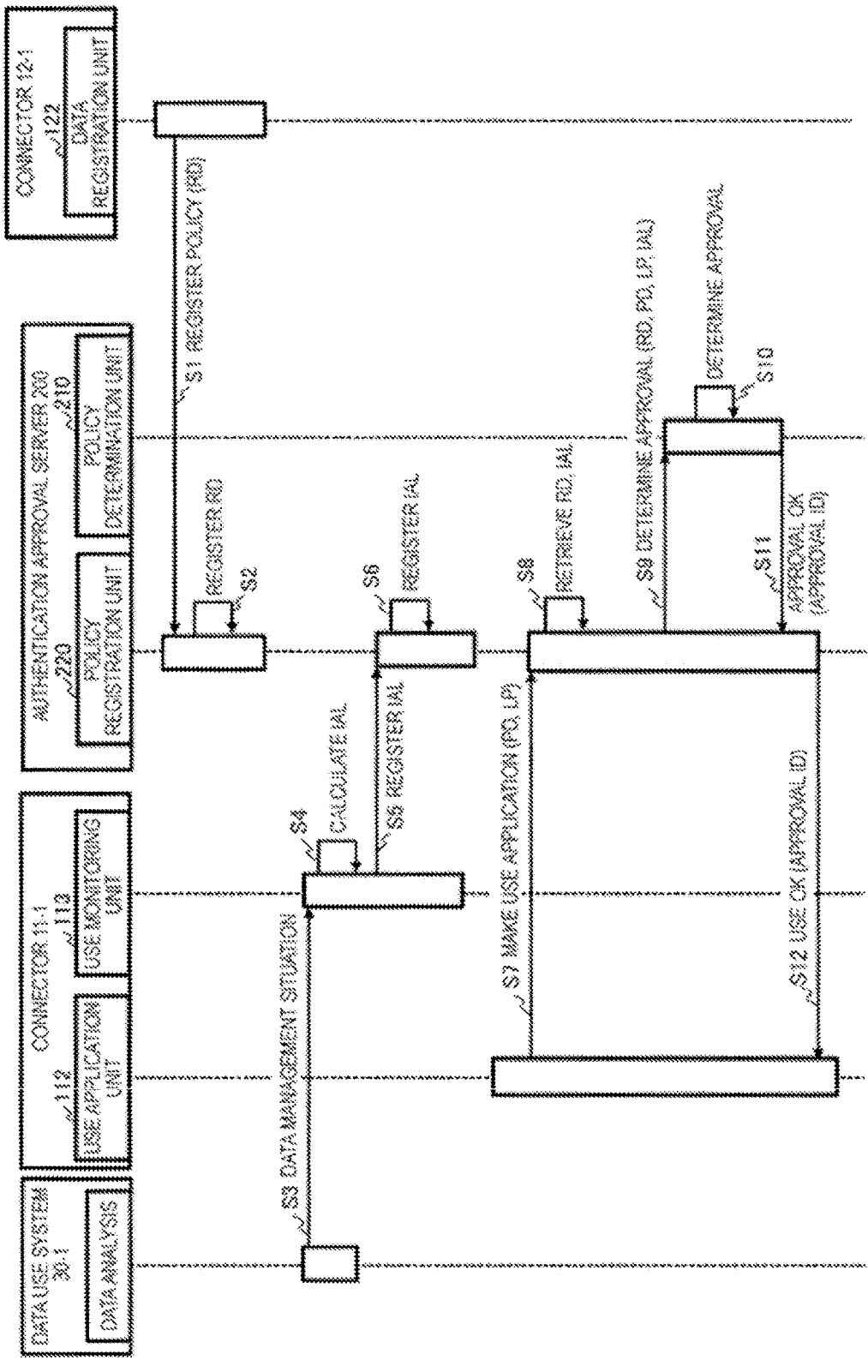

[FIG. 8]
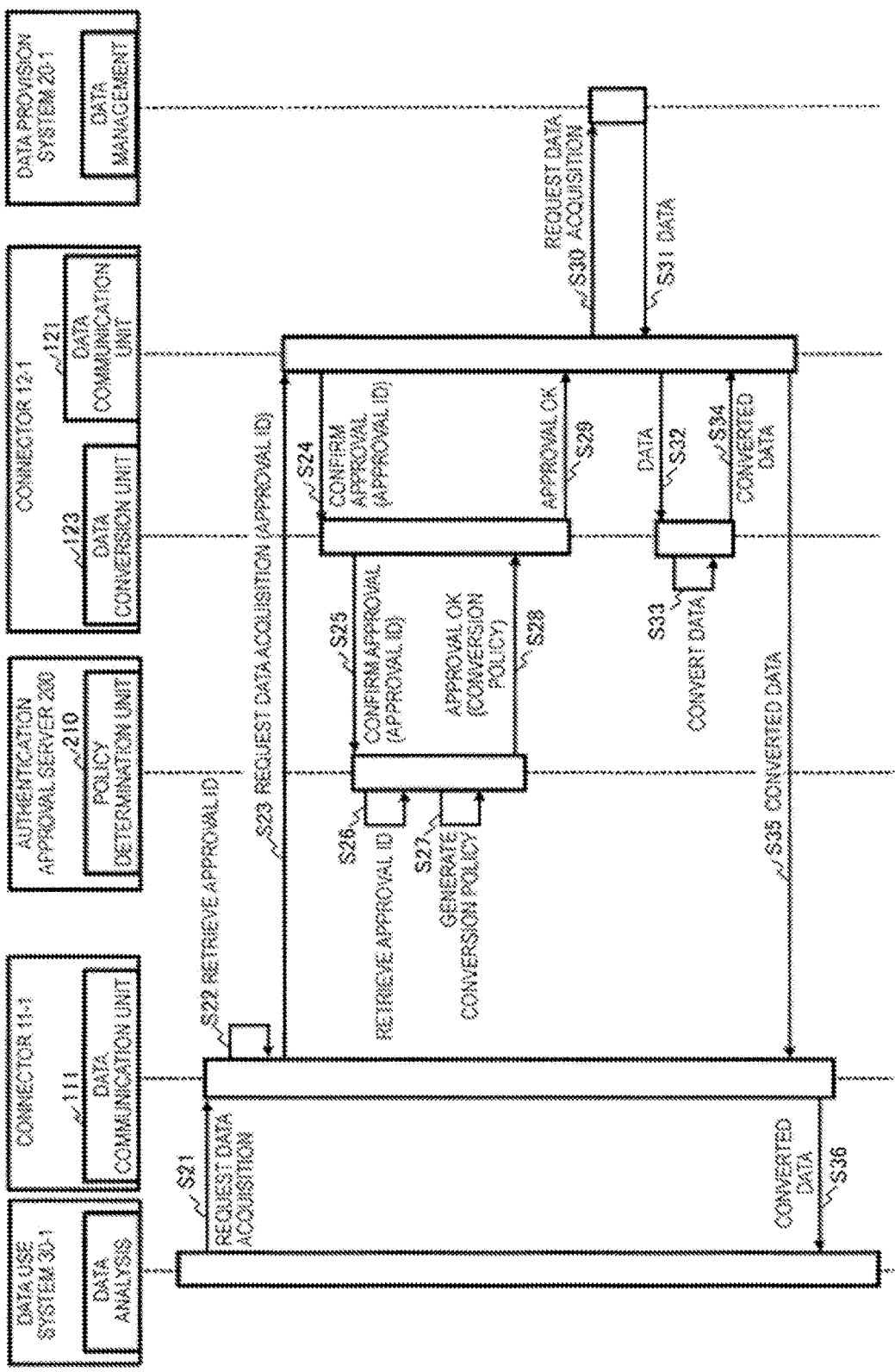

[FIG. 9]

320 APPROVAL TABLE

| APPRO-VAL ID | APPLICA-TION ID | DATA USER | DATA PROVIDER | USE SYSTEM | ORIGINAL DATA | CONFI-DENCE LEVEL TS | POST-CONVERSION DATA | PROVISION SYSTEM |
|---|---|---|---|---|---|---|---|---|
| 1234 | 3324 | USR1 | OWN1 | Svc#1 | CLIENT DATA | Ts1 | CLIENT DATA cnv | Sense1 |
| : | : | : | : | : | : | : | : | : |

330 RISK ASSESSMENT TABLE

| OCCURRENCE EVENT | ASSESSMENT ITEM | SCORE | ID |
|---|---|---|---|
| LOSS (LEAKAGE) OF CONFIDENTIALITY | SENSITIVE PERSONAL INFORMATION | 1.0 | 1 |
| | PERSONAL INFORMATION | 0.75 | 2 |
| | TOP-SECRET INFORMATION | 1.0 | 3 |
| | SECRET INFORMATION | 0.75 | 4 |
| | COMPANY SECRET INFORMATION | 0.5 | 5 |
| | OTHER INFORMATION | 0.25 | 6 |
| LOSS (FALSIFICATION) OF COMPLETENESS | FATAL INFLUENCE ON LIFE / PROPERTY OF Owner | 1.0 | 7 |
| | LARGE INFLUENCE ON LIFE / PROPERTY OF Owner | 0.75 | 8 |
| | INFLUENCE ON Owner | 0.5 | 9 |
| | NO INFLUENCE ON Owner | 0.25 | 10 |
| LOSS OF AVAILABILITY | DELETION IS NECESSARY WITHIN ONE DAY | 1.0 | 11 |
| | DELETION IS NECESSARY WITHIN ONE WEEK | 0.75 | 12 |
| | DELETION IS NECESSARY WITHIN ONE MONTH | 0.5 | 13 |
| | DELETION IS UNNECESSARY | 0.25 | 14 |
| LOSS OF DESCRIPTION PURSUIT | REGULATED IN LAW, etc. | 1.0 | 15 |
| | REGULATED IN INDUSTRY GUIDELINE, etc. | 0.75 | 16 |
| | REGULATED IN SELF-STANDARD | 0.5 | 17 |
| | DESCRIPTION PURSUIT IS UNNECESSARY | 0.25 | 18 |

340  PROTECTION LEVEL TABLE

| CONTEXT | ASSESSMENT ITEM | SCORE | ID |
|---|---|---|---|
| Who | ANYONE CAN ACCESS | 1.0 | 1 |
| | INTERNAL GENERAL USER, MANAGER | 0.5 | 2 |
| | ONLY INTERNAL MANAGER | 0.2 | 3 |
| Where | ACCESSIBILITY FROM REMOTE ENVIRONMENT | 1.0 | 4 |
| | ACCESSIBILITY AT SHORT RANGE DISTANCE, etc. | 0.5 | 5 |
| | ONLY LOCAL ACCESS | 0.2 | 6 |
| When | REGULAR ACCESS | 1.0 | 7 |
| | PLURALITY OF ACCESSES | 0.5 | 8 |
| | ONLY ONE ACCESS | 0.2 | 9 |
| What | 10,000 OR MORE PIECES OF DATA | 1.0 | 10 |
| | 100 TO 10,000 PIECES OF DATA | 0.5 | 11 |
| | LESS THAN 100 PIECES OF DATA | 0.2 | 12 |
| How | ACCESS WITH NO COUNTERMEASURE | 1.0 | 13 |
| | ACCESS BY TEMPORARY MEASURE CANCELLATION (ACCESS CONTROL, DECODING, etc.) | 0.5 | 14 |
| | ACCESS IN MEASURE STATE (ENCRYPTION, ANONYMIZATION) | 0.2 | 15 |

350  USE PURPOSE TABLE

| CLASSIFICATION ITEM | ASSESSMENT ITEM | SCORE | ID |
|---|---|---|---|
| MAGNITUDE OF SOCIAL INFLUENCE (PD_social) | EXTRA-LARGE (GLOBAL LEVEL) | 1.0 | 1 |
| | LARGE (NATION LEVEL) | 0.8 | 2 |
| | INTERMEDIATE (COMPANY, PREFECTURES LEVEL) | 0.5 | 3 |
| | SMALL (PERSONAL LEVEL) | 0.1 | 4 |
| BENEFIT (PD_owner) | EXTRA-LARGE | 1.0 | 5 |
| | LARGE | 0.8 | 6 |
| | INTERMEDIATE | 0.5 | 7 |
| | SMALL | 0.1 | 8 |

360  IMPLEMENTATION LEVEL TABLE

| IMPLEMENTATION LEVEL | SCORE |
|---|---|
| 90% OR MORE | 0.9 |
| ABOUT 10% TO 90% | 0.5 |
| LESS THAN 10% | 0.1 |

370  DATA CONVERSION TABLE

| PROCESSING CLASSIFICATION | TECHNIQUE | DATA TYPE | OVERVIEW | CONVERSION ID |
|---|---|---|---|---|
| SUPPRESSION | DELETION 1 | TEXT STRING | DELETE ATTRIBUTE (NAME, etc.) | S1 |
| | DELETION 2 | NUMERAL | DELETE SPECIAL VALUE (EXCEPTIONAL VALUE) | S2 |
| | ANONYMIZATION | TEXT STRING / NUMERAL | | S3 |
| GENERALIZATION | GENERALIZATION | TEXT STRING | REPLACE ATTRIBUTE VALUE WITH HIGHER VALUE OR CONCEPTION | G1 |
| | AMBIGUITY | NUMERAL | ARRANGE PARTICULARLY LARGE OR SMALL ATTRIBUTE VALUE IN NUMERAL ATTRIBUTES | G2 |
| DISTURBANCE | MICRO AGGREGATION | NUMERAL | GROUP ORIGINAL DATA AND REPLACE ORIGINAL DATA WITH REPRESENTATIVE VALUE | D1 |
| | NOISE ADDITION | NUMERAL | GRANT RANDOM NUMBER IN CONSTANT DISTRIBUTION | D2 |
| | DATA EXCHANGE | TEXT STRING | REPLACE ATTRIBUTE VALUE OF SAME ATTRIBUTE BETWEEN RECORDS (STOCHASTICALLY) | D3 |
| | PSEUDO-DATA GENERATION | NUMERAL | GENERATE ARTIFICIAL COMBINED DATA FOR MAKING DATA AS PSEUDO-DATA TO ORIGINAL DATA STOCHASTICALLY | D4 |

410 PROVISION POLICY

| PROVISION ID | DATA NAME | DATA PROVIDER | PROVISION SYSTEM | CONFIDEN -TIALITY | COMPLE -TENESS | AVAILA -BILITY | DESCRIPTION PURSUIT | BENEFIT |
|---|---|---|---|---|---|---|---|---|
| 123 | CLIENT DATA | OWN1 | Sense1 | 2 | 8 | 12 | 15 | >X |
| : | : | : | : | : | : | : | : | : |

420 USE POLICY

| APPLICATION ID | DATA NAME | DATA PROVIDER | DATA USER | Who | Where | When | What | How | INFLUENCE | BENEFIT |
|---|---|---|---|---|---|---|---|---|---|---|
| 123 | CLIENT DATA | OWN1 | Sense1 | 2 | 5 | 8 | 11 | 15 | 3 | 7 |
| : | : | : | : | : | : | : | : | : | : | : |

421 422 423 424 425 426 427 428 429 430 431

[FIG. 17]
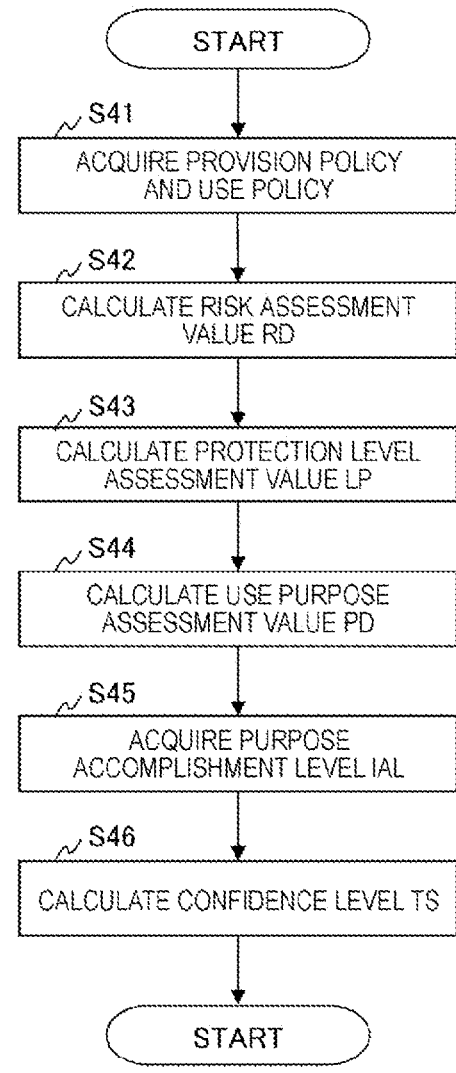

[FIG. 18]

DATA CIRCULATION CONTROL METHOD, DATA CIRCULATION CONTROL SYSTEM, AND APPROVAL SERVER

INCORPORATION BY REFERENCE

This application claims the priority of Japanese Patent Application No. 2021-12363, filed Jan. 28, 2021, the content of which is incorporated herein by reference.

TECHNICAL FIELD

The present invention relates to data access control between a data provider and a data user and a data provision method.

BACKGROUND ART

In recent years, with dramatic development of networking or cyberspace use, new services have been created one by one, and thus ultra-smart societies or the like producing abundance for people who are subjects of societies have been proposed.

For example, platforms of cooperation or circulation of data in which data of government, IoT data of infrastructures such as buildings or roads, and the like are cross-cooperated (hereinafter referred to as a city OSs) have been advocated.

A city OS relays data from provision sources (owners) to data users and the data users perform analysis, processing, and the like on the provided data to provide services. The data providers are reluctant to circulate valuable data among owned data.

In particular, when data of data providers include sensitive information such as personal information or information regarding individual movement, the data providers are not inactive in provision or circulation of such data, but permit provision or circulation of data in accordance with use purposes in some cases. In order for the data providers to examine provision of data to data users, it is necessary to clarify risks of providing the data, confidence in the data users, and the like.

For example, PTL 1 is known as a technology for estimating risks when data providers provide data to data users. PTL 1 discloses a risk calculation device that calculates a risk when a data provider provides data to a data user. The risk calculation device calculates a risk index by obtaining a risk element of data itself, an element related to data user, and an element related to relevance between a data provider and a data user based on information such as data to be provided, the data provider, a customer of the data provider and the data user.

CITATION LIST

Patent Literature

PTL 1: JP2018-142284A

SUMMARY OF INVENTION

Technical Problem

In the foregoing example of the related art, the risk index is calculated from the risk element of the data itself, an attribute of the data user, and the relevance between the data provider and the data user to perform access control. However, there is a problem that information regarding confidence in the data provider cannot be calculated.

That is, the data provider desires to determine provision of data not only based on a risk of providing the data but also based on a purpose for using the provided data and a value obtained in the provision of the data.

Accordingly, the present invention has been devised in view of the foregoing problems and an object of the present invention is to control access to data based on a use purpose of a data user for producing a value satisfying a data owner and a data protection level.

Solution to Problem

According to an aspect of the present invention, in a data circulation control method, an approval server including a processor and a memory controls access to data between a provision party computer providing the data and a use party computer using data. The method includes: a purpose accomplishment status notifying step in which the use party computer notifies the approval server of a use status of the previously approved data; a use application step in which the use party computer makes application to the approval server for a use policy including protection level information related to a security measure when the data is used and a use purpose of the data; and an access control step in which the approval server controls access of the use party computer to the data of the provision party computer based on the use status of the data, the protection level information, and the use purpose of the data.

In the foregoing configuration, it is possible to control access to data provided based on a use purpose of a data user for producing a value satisfying a data owner and a data protection level. An approval server can implement access control in accordance with a confidence level by calculating the confidence level of the data user from a policy of the data owner and a policy of the data user. For example, even when the data is personal information, data from which sensitive information is eliminated can be provided to the data user by performing an anonymizing process in which a data owner can have agreement.

Advantageous Effects of Invention

According to the present invention, it is possible to control access to data based on a use purpose of a data user for producing a value satisfying a data owner and a data protection level.

The details of at least one embodiment of the disclosed matters in the present specification will be described with reference to the appended drawings. Other features, aspects, and advantages of the disclosed matters are apparent from the following disclosure, drawings, and claims.

BRIEF DESCRIPTION OF DRAWINGS

FIG. 1 is a block diagram illustrating an example of a data circulation control system according to Example 1 of the present invention.

FIG. 2 is a block diagram illustrating an example of a connector of a data provision party according to Example 1 of the present invention.

FIG. 3 is a block diagram illustrating an example of a connector of a data user party according to Example 1 of the present invention.

FIG. 4 is a block diagram illustrating an example of an authentication approval server according to Example 1 of the present invention.

FIG. 5 is a diagram illustrating a concept of the data circulation control system according to Example 1 of the present invention.

FIG. 6 is a graph illustrating an example of a confidence level calculation model according to Example 1 of the present invention.

FIG. 7 is a sequence diagram illustrating an example of a process from policy registration to data access approval according to Example 1 of the present invention.

FIG. 8 is a sequence diagram illustrating an example of a data provision process according to Example 1 of the present invention.

FIG. 9 is a diagram illustrating an example of an approval table according to Example 1 of the present invention.

FIG. 10 is a diagram illustrating an example of a risk assessment table according to Example 1 of the present invention.

FIG. 11 is a diagram illustrating an example of a protection level table according to Example 1 of the present invention.

FIG. 12 is a diagram illustrating an example of a use purpose table according to Example 1 of the present invention.

FIG. 13 is a diagram illustrating an example of an implementation level table according to Example 1 of the present invention.

FIG. 14 is a diagram illustrating an example of a data conversion table according to Example 1 of the present invention.

FIG. 15 is a diagram illustrating an example of a provision policy according to Example 1 of the present invention.

FIG. 16 is a diagram illustrating an example of a use policy according to Example 1 of the present invention.

FIG. 17 is a flowchart illustrating an example of a confidence level calculation process according to Example 1 of the present invention.

FIG. 18 is a block diagram illustrating an example of a data circulation control system according to Example 2 of the present invention.

DESCRIPTION OF EMBODIMENTS

Hereinafter, embodiments of the present invention will be described with reference to the appended drawings.

Example 1

FIG. 1 is a block diagram illustrating an example of a data circulation control system according to Example 1 of the present invention.
<System Configuration>
The data circulation control system includes data provider sites OWN-1 to OWN-3 that provide data (original data 21), data user sites USR-1 to USR-3 that use data (converted data 31), an authentication approval server 200 that controls data access from the data provider sites OWN-1 to OWN-3 to the data user sites USR-1 to USR-3, a billing server 40 that calculates billing information to the data user sites USR-1 to USR-3 in accordance with a use status of data, and a network 70 that connects the sites to the server.

The data provider sites OWN-1 to OWN-3 have the same configuration. Therefore, when the data provider sites to be described below are not individually specified, reference sign "OWN" with no "-" and subsequent signs is used. The same applies to reference signs of other constituents such as USR-1 to USR-3.

An overview of the data circulation control system is that the original data 21 which a data user such as an individual, a company, or an organization desires to use to produce a value from the data is used within only a range of a condition (policy) permitted by a data provider such as an individual or a corporation owning the data. The authentication approval server 200 calculates a confidence level (trust score) of the data user based on a policy of the data provider in the policy determination unit 210, a use policy of the data user, and an operational status of the data.

The authentication approval server 200 determines whether to allow use of the original data 21 in accordance with a protection level of the data user, and when permitting the use, determines a conversion policy (anonymization level) of the original data 21 in accordance with a confidence level of the data user, and notifies the data provider site OWN of the conversion policy.

The data provider site OWN anonymizes the original data 21 in accordance with a conversion policy (anonymization level) set by the authentication approval server 200 to generate the converted data 31, and provides the converted data 31 to the data user site USR.

The data provider site OWN includes a sensor system 60 that collects data from a sensor attached to a facility, a machine, or the like, a data provision system 20 that acquires the data from the sensor system 60 and accumulates the data as the original data 21, and a connector 12 that communicates with the authentication approval server 200 and performs registration of a policy and provision of the original data 21.

The sensor system 60 includes the sensor (not illustrated) attached to a facility or a machine and a computer (not illustrated) that collects and outputs the data output by the sensor. The data provision system 20 includes a computer that stores the data acquired from the sensor system 60 as the original data 21 in a storage device (not illustrated) and performs business of the data provider. The data provision system 20 outputs the original data 21 in response to a request from the authentication approval server 200 via the connector 12.

The connector 12 of the data provider site OWN includes a data communication unit 121 that communicates with the authentication approval server 200, a data registration unit 122 that registers a policy or the like of the data provider in the authentication approval server 200, and a data conversion unit 123 that converts the original data 21 in response to the request from the authentication approval server 200 to generate converted data. The details of the connector 12 will be described below.

The authentication approval server 200 includes a policy registration unit 220 that manages a provision policy when a data provider provides data and a use policy when a data user uses data and a policy determination unit 210 that determines whether to allow access to provided data based on a use policy including a data protection level and a use purpose of the data user based on an application to use the data from the data user. The details of the authentication approval server 200 will be described below.

The data user site USR includes a data use system 30 that analyzes and processes the converted data 31 acquired from the data provider site OWN, a service system 50 that provides a predetermined service using the converted data 31 processed by the data use system 30, and a connector 11 that communicates with the authentication approval server 200 and performs registration of a policy and an application to use the converted data 31.

The connector 11 of the data user site USR includes a data communication unit 111 that communicates with the authentication approval server 200, a use application unit 112 that registers a policy, a use application, or the like of the data user in the authentication approval server 200, and a use monitoring unit 113 that monitors a use status of the converted data 31 in the data use system 30 and notifies the authentication approval server 200 of the use status. The details of the connector 11 will be described below.

The data use system 30 is a computer that performs a predetermined process such as analysis or processing on the converted data 31 and provides a processed result to the service system 50. The service system 50 is a computer that provides a predetermined service based on the result obtained by processing the converted data 31.

The number of data provider sites OWN and the number of data user sites USR are not limited to the foregoing numbers. The data providers and the data users can be configured by different groups, organizations, corporations, or the like.

The data user site USR and the data provider site OWN can be configured by adding the connectors 11 and 12 to existing sites. The connectors 11 and 12 function as interfaces connecting the authentication approval server 200 to the existing sites. The authentication approval server 200 instructs the connectors 11 and 12 to perform access to data at trust scores based on the polices of the data provider and the data user.

FIG. 2 is a block diagram illustrating an example of the connector 12 of a data provision party. The connector 12 is a computer that includes a processor 71, a memory 72, a storage device 73, a network interface 74, and an input/output device 75.

The data communication unit 121, the data registration unit 122, and the data conversion unit 123 are loaded to the memory 72 and are executed by the processor 71.

The processor 71 operates as a functional unit that provides a predetermined function by executing a process in accordance with a program of each functional unit. For example, the processor 71 functions as the data conversion unit 123 by performing a process in accordance with a data conversion program. The same applies to other programs. Further, the processor 71 also operates as a functional unit that provides a function of each of a plurality of processes executed by each program. The computer and the computer system are a device and a system including such functional units.

The network interface 74 is connected to the network 70 or the data provision system 20 to perform communication. The input/output device 75 includes an input device such as a keyboard, a mouse, or a touch panel and an output device such as a display.

The data registration unit 122 transmits a policy or the like of the data provider received from the input/output device 75 to the authentication approval server 200. The data conversion unit 123 generates the converted data 31 from the original data 21 in accordance with the conversion policy instructed by the authentication approval server 200 with regard to the original data 21 designated by the authentication approval server 200 and performs access control. The conversion of the data will be described below.

FIG. 3 is a block diagram illustrating an example of the connector 11 of a data user party. The connector 11 is a computer that includes a processor 81, a memory 82, a storage device 83, a network interface 84, and an input/output device 85.

The data communication unit 111, the use application unit 112, and the use monitoring unit 113 are loaded to the memory 82 and are executed by the processor 81. The processor 81 operates as a functional unit that provides a predetermined function by executing a process in accordance with a program of each functional unit. For example, the processor 81 functions as the use monitoring unit 113 by performing a process in accordance with a use monitoring program. The same applies to other programs. Further, the processor 81 also operates as a functional unit that provides a function of each of a plurality of processes executed by each program. The computer and the computer system are a device and a system including such functional units.

The network interface 84 is connected to the network 70 or the data use system 30 to perform communication. The input/output device 85 includes an input device such as a keyboard, a mouse, or a touch panel and an output device such as a display.

The use application unit 112 transmits a policy or the like of the data user received from the input/output device 85 to the authentication approval server 200. The use monitoring unit 113 monitors a status in which the data use system 30 uses the converted data 31 and notifies the authentication approval server 200 of the status. The use monitoring of the converted data 31 will be described below.

FIG. 4 is a block diagram illustrating an example of the authentication approval server 200. The authentication approval server 200 is a computer that includes a processor 201, a memory 202, a storage device 203, a network interface 204, and an input/output device 205.

The policy determination unit 210 and the policy registration unit 220 are loaded to the memory 202 and are executed by the processor 201. The processor 201 operates as a functional unit that provides a predetermined function by executing a process in accordance with a program of each functional unit. For example, the processor 201 functions as the policy determination unit 210 by performing a process in accordance with a policy determination program. The same applies to other programs. Further, the processor 201 also operates as a functional unit that provides a function of each of a plurality of processes executed by each program. The computer and the computer system are a device and a system including such functional units.

The network interface 204 is connected to the network 70 to perform communication with an external computer. The input/output device 205 includes an input device such as a keyboard, a mouse, or a touch panel and an output device such as a display.

The storage device 203 stores an approval table 320, a risk assessment table 330, a protection level table 340, a use purpose table 350, an implementation level table 360, a data conversion table 370, a provision policy 410, and a use policy 420.

In the approval table 320, a result obtained by determining whether to allow access for an application to use data from the data user site USR determined by the policy determination unit 210 is stored. In the risk assessment table 330, a preset risk in the data user site USR and a score for the risk are stored. In the protection level table 340, a preset security level of data in the data user site USR and a score for the security level are stored.

In the use purpose table 350, a preset use purpose and score for the use purpose are stored. In the implementation level table 360, a preset score related to an accomplishment possibility of the use purpose is stored. In the data conversion table 370, a preset conversion process is stored.

The provision policy 410 is information in which a use condition of the original data 21 determined in the data provider site OWN is registered in the authentication approval server 200. The use policy 420 is information in which a use condition of data of the data provider site OWN applied by the data user site USR is registered in the authentication approval server 200. The details of each table or the like will be described below.

All or some of programs and data for implementing processes of the connector 11, the connector 12, and the authentication approval server 200 may be stored in advance in the storage devices 73, 83, and 203 or may be stored from non-transitory storage devices or non-transitory storage media of other devices connected to the network 70 to the storage devices via UF included in each of the connector 11, the connector 12, and the authentication approval server 200, respectively, as necessary.

<Table>

FIG. 9 is a diagram illustrating an example of the approval table 320. In the approval table 320, a result of approvals by the policy determination unit 210 for the use application from the data user site USR is stored.

The approval table 320 includes an approval ID 321, an application ID 322, a data user 323, a data provider 324, a use system 325, original data 326, a confidence level 327, post-conversion data 328, and a provision system 329 in one record.

The approval ID 321 is an identifier for permitting use of the original data 21, the identifier being granted by the policy determination unit 210 of the authentication approval server 200. The application ID 322 is an identifier for an application to use data received from the data user site USR by the authentication approval server 200, the identifier being granted by the authentication approval server 200.

In the data user 323, an identifier of the data user site USR making an application to use the data is stored. In the data provider 324, an identifier of the data provider site OWN providing the original data 21 is stored.

In the use system 325, an identifier of the data use system 30 using the converted data 31 obtained by converting the original data 21 is stored. In the original data 326, a file name or an identifier of the original data 21 provided by the data provider site OWN is stored.

In the confidence level 327, as will be described below, a confidence level TS calculated when the approval ID is granted is stored. Instead of the confidence level TS, a type of anonymization performed in the filed of the original data 21 may be stored. In the post-conversion data 328, a name or an identifier of the converted data 31 obtained by performing anonymization on the original data 21 is stored. In the provision system 329, an identifier of the data provision system 20 managing the original data 21 is stored.

FIG. 10 is a diagram illustrating an example of the risk assessment table 330. The risk assessment table 330 is information in which an index (score) indicating a risk at which the data provider site OWN provides the original data 21 is set in advance.

The risk assessment table 330 includes an occurrence event 331, an assessment item 332, a score 333, and an ID 334 in one record. An example in which the occurrence event 331 is broadly classified into four types including a loss (leakage) of confidentiality, a loss (falsification) of completeness, a loss of availability, and a loss of description pursuit for the original data 21, is shown, but the present invention is not limited thereto.

In the assessment item 332, an item of a risk revealed by a data provider or the like is stored. Alternatively, a manager or the like of the authentication approval server 200 may set the assessment item 332. In the score 333, a value set in advance for each assessment item 332 is stored. In the ID 334, an identifier of the assessment item 332 is stored.

The policy determination unit 210 aggregates the score 333 for each occurrence event 331 and calculates a risk assessment value RD (Risk of Data). The risk assessment value RD can be assessed as a 4-dimensional vector of a maximum value by calculating the maximum value of the score 333 for each of the four occurrence events 331.

FIG. 11 is a diagram illustrating an example of the protection level table 340. The protection level table 340 is information in which a protection level for data is set in advance from context information in which a data user handles data (converted data 31). In the embodiment, the example in which the context information is configured with 4W1H related to use of data is shown, but the present invention is not limited thereto.

In a context of the embodiment, an example in which data is assessed from the viewpoints (4W1H) such as anybody (Who), a location (Where), a frequency (When), a volume (What), and a way to access (How) when data is handled has been described.

The protection level table 340 includes a context 341, an assessment item 342, a score 343, and an ID 344 in one record. The context 341 indicates classification of preset 4W1H. In the assessment item 342, an item of protection revealed by a data provider or a manager or the like of the authentication approval server 200 is stored. In the score 343, a value set in advance for each assessment item 342 is stored. In the ID 344, an identifier of the assessment item 332 is stored.

The policy determination unit 210 aggregates the score 343 for each context 341 and calculates a protection level assessment value LP (Level of Protection). The protection level assessment value LP can be calculated with the following expression when a value of the score 343 is expressed by Who, Where, When, What, and How for each of five contexts 341.

$$LP=1/(Who \times Where \times When \times What \times How) \qquad (1)$$

FIG. 12 is a diagram illustrating an example of the use purpose table 350. The use purpose table 350 is information in which a score is set in advance from two viewpoints of a social influence given from utilization of the original data 21 and a reward (benefit) for a data provider. The use purpose table 350 is information registered by the data user site USR in the policy registration unit 220.

The use purpose table 350 includes a classification item 351, an assessment item 352, a score 353, and an ID 354 in one record.

In the classification item 351, a classification of a use purpose is stored. In the embodiment, an example of two classifications including magnitude of a social influence and a benefit of a data provider is shown, but the present invention is not limited thereto. In the assessment item 352, magnitude of the influence is divided into four stages, small, intermediate, large, and extra-large. In the score 353, a preset value is stored. In the ID 354, an identifier of each assessment item 352 is stored.

The policy determination unit 210 aggregates the score 353 for each classification item 351 and calculates a use purpose assessment value PD (purpose of Data). For the use purpose assessment value PD, when the magnitude of the social influence is PD_social and the benefit is PD_owner, the score of the classification item 351 can be assessed as a 4-dimensional vector as follows.

$$PD=(\text{MAX}(PD\_social,PD\_owner),\text{MAX}(PD\_social, PD\_owner),\text{MAX }(PD\_social,PD\_owner),\text{MAX} (PD\_social,PD\_owner)) \quad (2)$$

FIG. 13 is a diagram illustrating an example of the implementation level table 360. In the implementation level table 360, a score set in advance for an accomplishment possibility of a use purpose (the use purpose assessment value PD) is stored as information set in advance to calculate a purpose accomplishment level IAL (Impact Assurance Level).

The implementation level table 360 includes an implementation level 361 and a score 362 in one record. In the implementation level 361, a range of a probability at which a use purpose is accomplished is set. In the score 362, a value in accordance with the range of the probability is stored.

When the purpose accomplishment level IAL is calculated by the connector 11 of the data user site USR, the connector 11 can acquire the implementation level table 360 from the authentication approval server 200.

FIG. 14 is a diagram illustrating an example of the data conversion table 370. The data conversion table 370 is information in which processing content at the time of anonymization of the original data 21 is set in advance. The data conversion table 370 includes a processing classification 371, a technique 372, a data type 373, an application 374, and a conversion ID 375 in one record.

For the processing classification 371, an example of three classifications including a suppression process, a generalization process, and a disturbance process, is shown, but the present invention is not limited thereto. In the suppression process, data is deleted or substituted. In the generalization process, data is converted into a representative value. In the disturbance process, noise is added to data.

In the technique 372, a technique for implementing the processing classification 371 is stored. In the application 374, specific content of the anonymization is stored. The conversion ID 375 is used when the authentication approval server 200 instructs the data provider site OWN to convert data.

The authentication approval server 200 calculates a confidence level of the data user with reference to each of the above-described tables and determines whether to allow the data use. The calculation of the confidence level or the like will be described below.

FIG. 15 is a diagram illustrating an example of the provision policy 410. The provision policy 410 is a use condition of the original data 21 determined by the data provider site OWN.

The provision policy 410 includes a provision ID 411, a data name 412, a data provider 413, a provision system 414, confidentiality 415, completeness 416, availability 417, description pursuit 418, and a benefit 419 in one record.

The provision ID 411 is an identifier set by the authentication approval server 200. In the data name 412, a name or an identifier of the original data 21 is stored. In the data provider 413, an identifier of the data provider site OWN is stored. In the provision system 414, an identifier of the data provision system 20 storing the original data 21 is stored.

In the confidentiality 415 to the description pursuit 418, the ID 334 corresponding to the assessment item 332 is stored for each occurrence event 331 of the risk assessment table 330. For example, confidentiality 415="2" indicates "personal information" of the assessment item 332 of the risk assessment table 330. The same applies to values of the completeness 416 to the description pursuit 418. In the benefit 419, a value of data expected by the data provider 413 is set.

FIG. 16 is a diagram illustrating an example of the use policy 420. The use policy 420 is a use condition of data when the data user site USR makes an application to use the original data 21.

The use policy 420 includes an application ID 421, a data name 422, a data provider 423, a data user 424, Who 425, Where 426, When 427, What 428, How 429, and an influence 430, and a benefit 431 in one record.

The application ID 421 is an identifier set by the authentication approval server 200. In the data name 422, a name or an identifier of the original data 21 desired by the data user site USR is stored. In the data provider 423, an identifier of the data provider site OWN is stored. In the data user 424, an identifier of the data user site USR is stored.

In Who 425 to How 429, the ID 344 corresponding to the assessment item 342 is stored for each context 341 of the protection level table 340. For example, Who 425="2" indicates "internal general user, manager" of the assessment item 342 of the protection level table 340. The same applies to values of Where 426 to How 429.

In the influence 430 and the benefit 431, the ID 354 corresponding to the assessment item 352 is stored for each classification item 351 of the use purpose table 350. For example, influence 430="3" indicates that an influence of the use purpose table 350 is "intermediate (company, prefectures level)". The same applies a value of the benefit 431.

<Overview of Process>

FIG. 5 is a diagram illustrating a concept of the data circulation control system. The data circulation control system according to the embodiment provides the original data 21 to a data user who desires to produce a value from data within a range of a condition (policy) permitted by a data provider, as described above.

To implement a concept of the data circulation control system, the data provider essentially has a desire to provide data. Therefore, it is important for the data provider to trust that the data provider can obtain a benefit in provision of data and the data user uses the data within only a range of a condition permitted by the data provider in the provision of the data.

The data circulation control system includes a policy decision point (PDP) that determines whether to allow access based on a confidence level and a policy enforcement point (PEP) that applies a determination result.

The PDP in FIG. 5 corresponds to the policy determination unit 210 illustrated in FIG. 1 and the PEP that applies the determination result corresponds to the data conversion unit 123 in the connector 12 of the data provider site OWN.

The policy determination unit 210 (PDP) receives the risk assessment value RD, the assessment value PD, the assessment value LP, and the purpose accomplishment level IAL via a policy information point (PIP). The PIP corresponds to the policy registration unit 220 in FIG. 1.

A monitoring point (MP) corresponds to the use monitoring unit 113 in the connector 11 of the data user site USR. The use monitoring unit 113 (MP) monitors and records whether the data user uses the data use system 30 in compliance with the use purpose and the use condition and whether a value produced by using the data is as promised.

The use monitoring unit 113 of the connector 11 calculates the purpose accomplishment level IAL based on the monitoring result and registers the purpose accomplishment level IAL in the policy registration unit 220 of the authentication approval server 200.

The following procedure is assumed as a procedure in which the data circulation control system is used. First, a data provider (the data provider site OWN) and a data user (the data user site USR) agree about a use purpose and a use condition of the original data 21 and a reward (benefit) associated with provision of the original data 21.

Subsequently, the data user site USR registers context information (4W1H information related to use of data) in the authentication approval server 200 via the connector 11. The authentication approval server 200 acquires the use condition (policy) agreed between the data provider and the data user and determines whether the context information satisfies the policy. When the authentication approval server 200 determines that the context information satisfies the policy, the data user is permitted to access the data provided by the data user site USR.

Subsequently, the authentication approval server 200 acquires the policy of the data provider site OWN and the policy of the data user site USR or a use status of the previously used converted data 31 and calculates a confidence level from the above-described risk assessment value RD, assessment value PD, and assessment value LP and purpose accomplishment level IAL, as will be described below.

The authentication approval server 200 sets a conversion policy (access policy) for anonymizing the original data 21 in accordance with the calculated confidence level and notifies the connector 12 of the data provider site OWN of the conversion policy.

In the connector 12 of the data provider site OWN, the data conversion unit 123 converts the original data 21 based on the conversion policy received from the authentication approval server 200 to generate the converted data 31 and provides the converted data 31 to the data user site USR.

The authentication approval server 200 continuously monitors whether the value produced by utilizing the acquired data (the converted data 31) by the data user is a value associated with the use purpose and the benefit given to the data provider meets the agreed condition.

The authentication approval server 200 notifies the billing server 40 of the value to be given to the data provider and the billing server 40 charges the data user (the data user site USR) for a price of the value produced utilizing the converted data 31.

<Calculation of Confidence Level>

FIG. 17 is a flowchart illustrating an example of a confidence level calculation process performed in the authentication approval server 200. This process can be performed when an application to use the original data 21 is received from the data user site USR.

The policy determination unit 210 of the authentication approval server 200 acquires the use policy 420 of the use application received from the data user site USR and the provision policy 410 of the data provider site OWN owning the data name 422 designated with the use policy 420 (S41).

The policy determination unit 210 acquires values of the confidentiality 415 to the description pursuit 418 of the provision policy 410 and calculates the risk assessment value RD from the risk assessment table 330 (S42). The policy determination unit 210 calculates a maximum value of the score 333 for each of four occurrence events (the confidentiality 415 to the description pursuit 418) and calculates the risk assessment value RD as a 4-dimensional vector of the maximum value.

Subsequently, the policy determination unit 210 acquires values of Who 425 to How 429 which are contexts of the use policy 420, acquires the score 343 for each of the contexts from the protection level table 340, and calculates the protection level assessment value LP (S43). The protection level assessment value LP can be calculated as in, for example, the above-described Expression (1).

The policy determination unit 210 acquires the influence 430 which is a use purpose of the use policy 420 and the benefit 431 and calculates the use purpose assessment value PD (S44). The use purpose assessment value PD can be calculated, for example, as in the above-described Expression (2).

The policy determination unit 210 calculates the purpose accomplishment level IAL from a monitoring status of the previous converted data 31 registered by the use monitoring unit 113 of the connector 11 of the data user site USR with reference to the implementation level table 360 (S45). The monitoring status of the previous converted data 31 can be used as, for example, a use rate of the converted data 31 in the data use system 30 and the score 362 can be calculated as the purpose accomplishment level IAL by using the use rate as the implementation level 361 of the implementation level table 360.

Subsequently, the policy determination unit 210 calculates the confidence level TS by the following expression from the calculated risk assessment value RD, protection level assessment value LP, use purpose assessment value PD, and purpose accomplishment level IAL.

[Math. 1]

$$TS = \overrightarrow{PD} \times IAL - (LP \times \overrightarrow{RD}) \tag{3}$$

Through the foregoing process, the policy determination unit 210 can calculate the confidence level TS and notify the connector 12 of the data provider site OWN of the access control in accordance with the confidence level TS. For example, when the confidence level TS is positive, the policy determination unit 210 can use the original data 21 as it is without anonymizing the original data 21 in the data user site USR. Conversely, when the confidence level TS is negative, use and application of the data is implemented by anonymization in accordance with magnitude of a negative value and decreasing the value of the protection level assessment value LP.

FIG. 6 is a graph illustrating an example of a confidence level calculation model. In the illustrated example, a relation among the protection level assessment value LP, the use purpose assessment value PD, and the purpose accomplishment level IAL with respect to a preset risk function R is illustrated.

In the drawing, a current risk is a value of the risk R calculated from the risk function set in advance from the protection level assessment value LP of the use policy 420. For the current risk, the confidence level TS is calculated from the use purpose assessment value PD and the purpose accomplishment level IAL.

A feature of the policy determination unit 210 is that the confidence level TS is calculated by adding not only a risk of the party of the data user site USR but also the use purpose of the data user site USR and a use result of the previous converted data 31.

<Access Control>

A function DAC of converting the original data 21 (data) into the converted data 31 (data') which is to be provided to the data user site USR based on the confidence level TS is assumed to be DAC(data,TS)→data'.

To determine how much an information amount of the converted data 31 is reduced from the original data 21, a Kullback-Leibler information amount (hereinafter referred to as a KL information amount) used to measure a distance in a probability distribution space is used.

When P and Q are discrete probability distributions, KL information amounts of P to Q are expressed as the following expression.

[Math. 2]

$$D_{KL}(P\|Q) := \sum_i \left( P_i \log \frac{P_i}{Q_i} \right) \tag{4}$$

Here, Pi and Qi are probabilities when a selected value is i in accordance with the probability distributions P and Q, respectively.

Information amounts H(P) and H(Q) of the discrete probability distributions are used to express the following expression.

[Math. 3]

$$D_{KL}(P\|Q) = H(Q) - H(P) \tag{5}$$

When Q=P,

[Math. 4]

$$D_{KL}(P\|Q) = 0 \tag{6}$$

the above expression is established.

When H(Q)=n,

[Math. 5]

$$0 \le D_{KL}(P\|Q) \le n \tag{7}$$

the above expression is established.

A case in which the data access control function DAC is related to a distance function d and is based on a trust score (confidence level) function TSF is a case in which, for vd-label-attached data data, the discrete probability distribution P, a protection level lp, a use purpose pd, and the discrete probability distribution Q of the converted data,

[Math. 6]

$$d(\text{data}, \text{DAC}(\text{TSF}(vd, pd, lp), \text{data})) = D_{KL}(P\|Q) \tag{8}$$

the above expression is established.

The information amount of the data data before the conversion disclosed in the data data' output by the data access control function DAC can be quantitatively assessed. Hereinafter, for the sake of simplicity, a distance between the original data data and the converted data data' is referred to as d (data, data').

A case in which anonymization in accordance with the distance d is used as a process in the data access control function DAC will be considered. In the anonymization, as shown in the data conversion table 370 of FIG. 14, the authentication approval server 200 can generate a conversion policy by using the suppression, the generalization, the disturbance, and the like. As a specific scheme for the anonymization, a known or publicized scheme such as K-anonymity may be used.

<Registration Process>

FIG. 7 is a sequence diagram illustrating an example of a process from policy registration to data access approval.

First, the connector 12 (12-1 in the drawing) of the data provider site OWN transmits the provision policy 410 (FIG. 16) in which the data user sets the use condition of the original data 21 to the authentication approval server 200 to make a request for registration (S1).

In the authentication approval server 200, the policy registration unit 220 receives the provision policy 410 and stores the provision policy 410 in the storage device 203. The policy registration unit 220 registers the risk assessment value RD (Risk of Data) of the data name 412 designated in the provision policy 410 as information to be calculated (S2).

In the data user site USR, the use monitoring unit 113 of the connector 11 (11-1 in the drawing) monitors a use status of the converted data 31 in the data use system 30 (30-1 in the drawing) (S3). A target of which a use status is monitored by the use monitoring unit 113 is the converted data 31 which has been approved and is being used. The use monitoring unit 113 acquires the implementation level table 360 from the authentication approval server 200 and calculates the purpose accomplishment level IAL (S4).

Then, the use monitoring unit 113 registers the calculated purpose accomplishment level IAL in the authentication approval server 200 (S5). In the authentication approval server 200, the purpose accomplishment level IAL received by the policy registration unit 220 is registered as the purpose accomplishment level IAL for each data user site USR in the storage device 203 (S6).

The data user site USR transmits a use application from the use application unit 112 of the connector 11 to the authentication approval server 200 when the original data 21 of the data provider site OWN is desired to be used as data used by the own service system 50 (S7). The use policy 420 including a protection level and a use purpose, as illustrated in FIG. 16, is attached to the use application (S7).

The policy registration unit 220 of the authentication approval server 200 retrieves the purpose accomplishment level IAL of the data user 424 described in the use policy 420 from the storage device 203 and retrieves the provision policy 410 of the original data 21 corresponding to the data name 422 of the use policy 420 (410). The policy registration unit 220 acquires the four occurrence events (the confidentiality 415 to the description pursuit 418) for calculating the risk assessment value RD from the provision policy 410 and acquires the purpose accomplishment level IAL of the data user 424 to output the occurrence events and the purpose accomplishment level IAL to the policy determination unit 210 (S9).

The policy determination unit 210 calculates the risk assessment value RD, the use purpose assessment value PD, and the protection level assessment value LP from the four occurrence events, as described above and then adds the purpose accomplishment level IAL to calculate the confidence level TS. Then, the policy determination unit 210 permits the access of the data user site USR when the protection level assessment value LP (or the context information) of the data user site USR satisfies a predetermined condition (S10).

When the access is permitted, the policy determination unit 210 determines the conversion policy (anonymization level), as described above, and notifies the policy registration unit 220 of the approval ID in order to perform the access control in accordance with a value of the confidence level TS (S11). When the approval ID is determined, the policy determination unit 210 adds a new record to the approval table 320 and stores the new record in the data user site USR and the data provider site OWN.

The policy registration unit 220 of the authentication approval server 200 notifies the connector 11 of the data provider site OWN of the approval ID and the conversion policy to permit the access to the original data 21. When the policy determination unit 210 does not permit the access of the data user site USR, the policy registration unit 220 notifies the connector 11 of access denial.

<Use Process>

FIG. 8 is a sequence diagram illustrating an example of a data provision process. This process is performed when the data user site USR transmits a request for acquiring the original data 21. In the data user site USR, the data use system 30 transmits the request for acquiring the original data 21 to the connector 11 (S21).

The data communication unit 111 of the connector 11 determines whether the approval ID has been acquired for the original data 21 requested by the data use system (S22). Since the approval ID received from the authentication approval server 200 is stored in the storage device 73 of the connector 11, a file name or the like of the original data 21 can be retrieved.

When the approval ID has already been acquired, the data communication unit 111 of the connector 11 transmits the data acquisition request and the approval ID to the connector 12 of the data provider site OWN (S23). When the data acquisition request and the approval ID are received, the data communication unit 121 of the connector 12 transmits the approval ID to the data conversion unit 123 (S24). The data conversion unit 123 transmits the approval ID to the authentication approval server 200 to inquire about whether there is an approval (S25).

The authentication approval server 200 retrieves the approval table 320 with the approval ID received by the policy determination unit 210 to acquire the confidence level 327 (S26). Since the policy determination unit 210 performs the access control in accordance with the value of the acquired confidence level 327, the conversion policy (anonymization policy) is generated (S27).

The policy determination unit 210 of the authentication approval server 200 transmits the conversion policy indicating a status in which the approval has been made to the connector 12 of the data provider site OWN (S28). When the conversion policy does not correspond to the approval ID 321, the policy determination unit 210 notifies the connector 12 of non-approval and ends the process.

When the conversion policy indicating the approval has been made is received, the data conversion unit 123 of the connector 12 notifies the data communication unit 121 that the use of the original data 21 designated with the approval ID is approved (S29).

The data communication unit 121 of the connector 12 requests the data provision system 20 to acquire the original data 21 (S30). The data provision system 20 transmits the designated original data 21 to the connector 12 (S31). In the connector 12, the data communication unit 121 receives the original data 21 and transmits the original data 21 to the data conversion unit 123 (S32).

The data conversion unit 123 anonymizes the original data 21 with the conversion policy received from the authentication approval server 200 to generate the converted data 31 (S33) and transmits the converted data 31 to the data communication unit 121 (S34). When the confidence level 327 is positive, the original data 21 may be output as the converted data 31 without being anonymized.

The data communication unit 121 of the connector 12 transmits the converted data 31 to the connector 11 of the data user site USR using the converted data 31 (S35). The data communication unit 111 of the connector 11 transmits the converted data 31 received from the data provider site OWN to the data use system 30 (S36).

The data use system 30 can obtain a value as a price of the service provision by analyzing or processing the acquired converted data 31 and providing the analyzed or processed converted data 31 to the service system 50.

As described above, the data circulation control system according to the present example can determine whether to allow access to the data provided based on the data protection level and the use purpose of the data user producing a value satisfied by a data owner.

The authentication approval server 200 can implement the access control of the original data 21 by calculating the confidence level TS of the data user from the policy (the provision policy 410) of the data owner and the policy (the use policy 420) of the data user and generating the conversion policy in accordance with the confidence level TS.

The data provider does not subjectively define a use condition of the original data 21, but the data circulation control system according to the present example can dynamically derive a use condition (policy) from the risk (RD) of the original data 21 which is a source for deriving the use condition and the use purpose (PD) presented by the data user.

By introducing a structure that protects/has no harm influence on a data provider who is not satisfied with a use condition within a range in which the original data 21 is anonymized and there is no hindrance to use of the data, it is possible to achieve vitalization of industries through free circulation of the original data 21 and a right protection of the data provider.

Example 2

Figure 18:
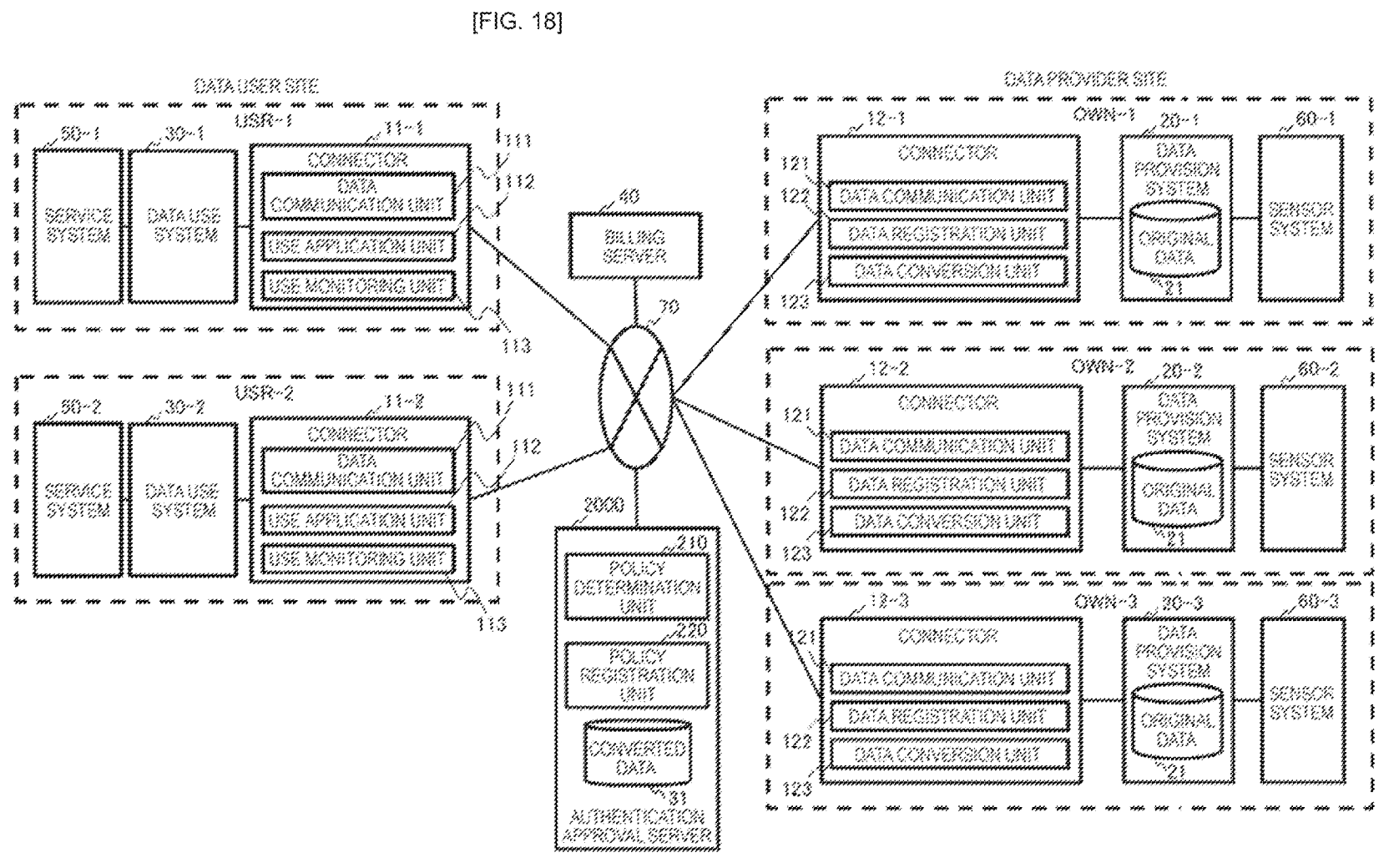

FIG. 18 is a block diagram illustrating an example of a data circulation control system according to Example 2. In Example 2, an authentication approval server 2000 stores the converted data 31 and provides the converted data 31 as a database to the data user sites USR-1 and USR-2. The other configurations are similar to those of Example 1.

By aggregating the converted data 31 in a database and using data which is the same as the original data 21 and has a similar conversion policy, it is possible to reduce a load of the connector 12 of the data provider site OWN. Since the data user site USR may access the converted data 31 of the authentication approval server 2000 as necessary, a storage device of the data use system 30 can be saved.

CONCLUSION

As described above, the data circulation control system according to the foregoing examples can be configured as follows.

(1) In a data circulation control method, an approval server (the authentication approval server 200) including a processor (201) and a memory (202) controls access to data (the original data 21) between a provision party computer (the data provision system 20) providing the data (the original data 21) and a use party computer (the data use system 30) using data (converted data 31). The method includes: a purpose accomplishment status notifying step (the use monitoring unit 113) in which the use party computer (30) notifies the approval server (200) of a use status of the previously approved data {31}; a use application step (the use application unit 112) in which the use party computer (30) makes application to the approval server (200) for a use policy including protection level information (340) related to a security measure when the data (31) is used and a use purpose (350) of the data; and an access control step (the policy determination unit 210) in which the approval server (200) controls access of the use party computer (30) to the data (21) of the provision party computer (20) based on the use status of the data (31), the protection level information (340), and the use purpose (350) of the data.

In the foregoing configuration, according to the data circulation control method, it is possible to control access to the original data 21 provided based on the use purpose of the data user producing a value satisfied by the data provider (owner) and the data protection level. The authentication approval server 200 can implement access control in accordance with a confidence level by calculating the confidence level of the data user from the policy of the data provider (the owner) and the policy of the data user. For example, even when the data is personal information, data from which sensitive information is eliminated can be provided to the data user by performing an anonymizing process in which a data owner can have agreement.

(2) The data circulation control method according to the foregoing (1) further includes a provision policy registration step (the data registration unit 122) in which the provision party computer (20) registers risk information (the provision policy 410) related to a risk (the risk assessment table 330) of the data to be provided in the approval server (200). In the access control step (210), the access of the use party computer (30) to the data (21) of the provision party computer (20) is controlled based on the risk information (410) in addition to the use status of the data (31), the protection level information (340), and the use purpose (350) of the data.

In the foregoing configuration, it is possible to implement the control of the access from a data user site USR in consideration of the degree of influence on the data provider when the original data 21 is not appropriately treated.

(3) In the data circulation control method according to the foregoing (2), the access control step (210) includes a step (S42) of calculating a risk assessment value RD indicating magnitude of a risk from the risk information (410), a step (S43) of calculating a protection level assessment value LP indicating a level of a security measure from the protection level information (340), a step (S44) of calculating a use purpose assessment value PD from the use purpose (350) of the data (21), a step (S45) of calculating a purpose accomplishment level IAL as a score at which the use purpose (350) is achievable from the use status of the data (31), a step (S46) of calculating a confidence level TS from the risk assessment value RD, the protection level assessment value LP, the use purpose assessment value PD, and the purpose accomplishment level IAL, and a step of generating an access policy based on the confidence level.

In the foregoing configuration, the policy determination unit 210 can obtain confidence of the data provider site OWN in use of the converted data 31 by the data user site USR in only a range of a permitted condition (the provision policy 410) when the data provider site OWN provides the original data 21 by calculating the confidence level TS including the use purpose assessment value PD and the purpose accomplishment level IAL in addition to the risk assessment value RD and the protection level assessment value LP.

(4) In the data circulation control method according to the foregoing (3), the purpose accomplishment level IAL is calculated as an assessment value of a possibility of achieving the use purpose (350) of the data based on a use result of data (31) used previously by the use party computer (30).

In the foregoing configuration, it is possible to use magnitude of a social influence included in the use policy 420 promised by the data user site USR or an implementation rate of a benefit of the data provider site OWN as the purpose accomplishment level IAL, and define an expected value of a social influence promised for the use of the original data 21 by the data user site USR or the benefit of the data provider site OWN. By using the purpose accomplishment level IAL when an acceptable risk is calculated, it is possible to correct the risk assessment value RD.

(5) In the data circulation control method according to the foregoing (3), in the risk information (410), a score (333) is set in each of confidentiality (415), completeness (416), availability (417), and description pursuit (418) of the data (21).

In the foregoing configuration, the data provider site OWN can define a value of the original data 21 to be provided as the confidentiality 415, the completeness 416, the availability 417, and the description pursuit 418.

The present invention is not limited to the foregoing examples and include various modifications. For example, the foregoing examples have been described in detail to facilitate the description and all the described configurations may not be necessarily included. A part of a configuration according to a certain embodiment can be replaced with a configurations according to another embodiment, and a configuration according to another embodiment can also be added to a configuration according to a certain embodiment. For a part of the configuration according to each embodiment, addition, deletion, or replacement of another configuration can be applied solely or in combination.

Some or all of the foregoing configurations, functions, processing units, processing methods, and the like may be implemented by hardware, for example, by designing integrated circuits. The foregoing configurations, functions, and the like may be implemented by software by causing a processor to interpret and execute a program implementing each function. Information such as a program, a table, or a file implementing each function can be stored on a recording device such as a memory, a hard disk, a solid-state drive (SSD) or a recording medium such as an IC card, an SD card, or a DVD.

Control lines or information lines necessary for description are illustrated and all the control lines and information lines are not necessarily illustrated in terms of a product. Actually, it may be considered that most of all the configurations are connected to each other.

The invention claimed is:

1. A data circulation control method in which an approval server including a processor and a memory controls access to data between a provision party computer providing the data and a use party computer using the data, the method characterized by comprising:

a purpose accomplishment status notifying step in which the use party computer notifies the approval server of a previously approved use status of the data;

a use application step in which the use party computer makes application to the approval server for a use policy including protection level information related to a security measure when the data is used and a use purpose of the data;

an access control step in which the approval server controls access of the use party computer to the data of the provision party computer based on the previously approved use status of the data, the protection level information, and the use purpose of the data; and a provision policy registration step in which the provision party computer registers risk information related to a risk of the data to be provided in the approval server, wherein, in the access control step, the access of the use party computer to the data of the provision party computer is controlled based on the risk information in addition to the previously approved use status of the data, the protection level information, and the use purpose of the data, and wherein the access control step includes:

a step of calculating a risk assessment value RD indicating magnitude of a risk from the risk information, a step of calculating a protection level assessment value LP indicating a level of a security measure from the protection level information, a step of calculating a use purpose assessment value PD from the use purpose of the data, a step of calculating a purpose accomplishment level IAL as a score at which the use purpose is achievable from the previously approved use status of the data, a step of calculating a confidence level from the risk assessment value RD, the protection level assessment value LP, the use purpose assessment value PD, and the purpose accomplishment level IAL, and a step of generating an access policy based on the confidence level.

2. The data circulation control method according to claim 1, characterized in that the purpose accomplishment level IAL is calculated as an assessment value of a possibility of achieving the use purpose of the data based on a use result of data used previously by the use party computer.

3. The data circulation control method according to claim 1, characterized in that, in the risk information, a score is set in each of confidentiality, completeness, availability, and description pursuit of the data.

4. A data circulation control system comprising:

an approval server including a first processor and a first memory comprising a policy determination point program executable by the first processor;

a provision party computer configured to provide data; and a use party computer comprising a second processor and a second memory, the second memory comprising a use application point program and a monitoring point program executable by the second processor, the use party computer configured to use the data, wherein the use application point program applies to the approval server for a use policy including protection level information related to a security measure when the data is used and a use purpose of the data, wherein the monitoring point program notifies the approval server of a previously approved use status of the data, the use status indicating an achievement status of the use purpose of the data, and wherein the approval server includes the policy determination point program controls access of the use party computer to the data of the provision party computer based on the previously approved use status of the data, the protection level information, and the use purpose of the data.

5. The data circulation control system according to claim 4, characterized in that the provision party computer includes a third processor and a third memory comprising a policy registration program executable by the third processor, the policy registration program registers risk information related to a risk of the data to be provided in the approval server, and the policy registration program controls the access of the use party computer to the data of the provision party computer based on the risk information in addition to the previously approved use status of the data, the protection level information, and the use purpose of the data.

6. The data circulation control system according to claim 5, characterized in that the policy determination point program calculates a risk assessment value RD indicating magnitude of a risk from the risk information, calculates a protection level assessment value LP indicating a level of a security measure from the protection level information, calculates a use purpose assessment value PD from the use purpose of the data, calculates a purpose accomplishment level IAL as a score at which the use purpose is achievable from the previously approved use status of the data, calculates a confidence level from the risk assessment value RD, the protection level assessment value LP, the use purpose assessment value PD, and the purpose accomplishment level IAL, and generates an access policy based on the confidence level.

7. The data circulation control system according to claim 6, characterized in that the purpose accomplishment level IAL is calculated as an assessment value of a possibility of achieving the use purpose of the data based on a use result of data used previously by the use party computer.

8. The data circulation control system according to claim 6, characterized in that, in the risk information, a score is set in each of confidentiality, completeness, availability, and description pursuit of the data.

9. An approval server characterized by comprising a processor and a memory, wherein the processor receives a use status of previously approved data from a use party computer, wherein the processor receives, from the use party computer, a use policy including protection level information related to a security measure when the data is used and a use purpose of the data, wherein the processor controls access of the use party computer to the data of a provision party computer based on the use status of the data, the protection level information, and the use purpose of the data, wherein approval server is further characterized in that the processor receives risk information related to a risk of the data from the provision party computer, and the processor controls the access of the use party computer to the data of the provision party computer based on the risk information in addition to the use status of the data, the protection level information, and the use purpose of the data, and wherein approval server is further characterized in that the processor performs calculates a risk assessment value RD indicating magnitude of a risk from the risk information, calculates a protection level assessment value LP indicating a level of a security measure from the protection level information, calculates a use purpose assessment value PD from the use purpose of the data, calculates a purpose accomplishment level IAL as a score at which the use purpose is achievable from the use status of the data, calculates a confidence level from the risk assessment value RD, the protection level assessment value LP, the use purpose assessment value PD, and the purpose accomplishment level IAL, and generates an access policy based on the confidence level.

10. The approval server according to claim 9, characterized in that the purpose accomplishment level IAL is calculated as an assessment value of a possibility of achieving the use purpose of the data based on a use result of data used previously by the use party computer.

11. The approval server according to claim 10, characterized in that, in the risk information, a score is set in each of confidentiality, completeness, availability, and description pursuit of the data.

\* \* \* \* \*